(12) United States Patent
Umehara

(10) Patent No.: US 12,389,448 B2
(45) Date of Patent: Aug. 12, 2025

(54) COMMUNICATION APPARATUS CAPABLE OF TRANSMITTING SIGNAL OVER MULTIPLE WIRELESS LINKS, COMMUNICATION METHOD, AND STORAGE MEDIUM

(71) Applicant: CANON KABUSHIKI KAISHA, Tokyo (JP)

(72) Inventor: Makoto Umehara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 443 days.

(21) Appl. No.: 17/845,663

(22) Filed: Jun. 21, 2022

(65) Prior Publication Data

US 2022/0322432 A1 Oct. 6, 2022

Related U.S. Application Data

(63) Continuation of application No. PCT/JP2020/046909, filed on Dec. 16, 2020.

(30) Foreign Application Priority Data

Dec. 24, 2019 (JP) .................................. 2019-233224

(51) Int. Cl.
*H04W 74/0808* (2024.01)
*H04W 76/15* (2018.01)
*H04W 84/12* (2009.01)

(52) U.S. Cl.
CPC ....... *H04W 74/0808* (2013.01); *H04W 76/15* (2018.02); *H04W 84/12* (2013.01)

(58) Field of Classification Search
CPC .. H04W 74/0808; H04W 76/15; H04W 84/12
See application file for complete search history.

(56) References Cited

U.S. PATENT DOCUMENTS

| 11,611,462 | B2* | 3/2023 | Chu ................. | H04W 72/0446 |
| 2020/0314920 | A1* | 10/2020 | Seok ................ | H04W 74/0808 |
| 2022/0394756 | A1* | 12/2022 | Jang ................. | H04W 74/0808 |
| 2023/0032578 | A1* | 2/2023 | Kim ................. | H04W 74/0866 |

FOREIGN PATENT DOCUMENTS

JP 2006-157733 A 6/2006

OTHER PUBLICATIONS

Jang, et al., Channel Access for Multi-link Operation, IEEE 802.11-19/1144r6, Jul. 2019.
Murti, et al., Performance and Fairness of Multi-link Operation, IEEE 802.11-19/1633r1, Nov. 2019.

* cited by examiner

*Primary Examiner* — Robert C Scheibel
(74) *Attorney, Agent, or Firm* — Canon U.S.A., Inc. IP Division

(57) ABSTRACT

A communication apparatus is capable of using a method of transmitting a signal using a plurality of wireless links, based on confirmation that a wireless medium related to one wireless link among the plurality of wireless links varying in frequency channels is idle for a random backoff time determined by a first method, and a method of transmitting a signal using one wireless link, based on confirmation that a wireless medium related to the one wireless link is idle for a random backoff time determined by a second method, wherein an expectation value of the random backoff time determined by the first method is larger than an expectation value of the random backoff time determined by the second method.

10 Claims, 6 Drawing Sheets

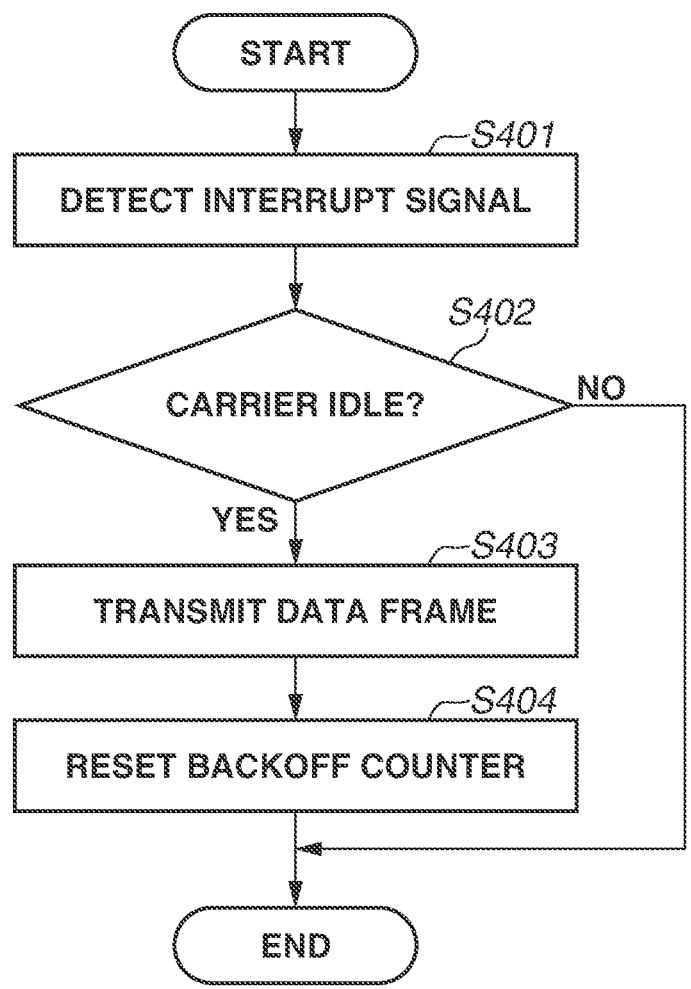

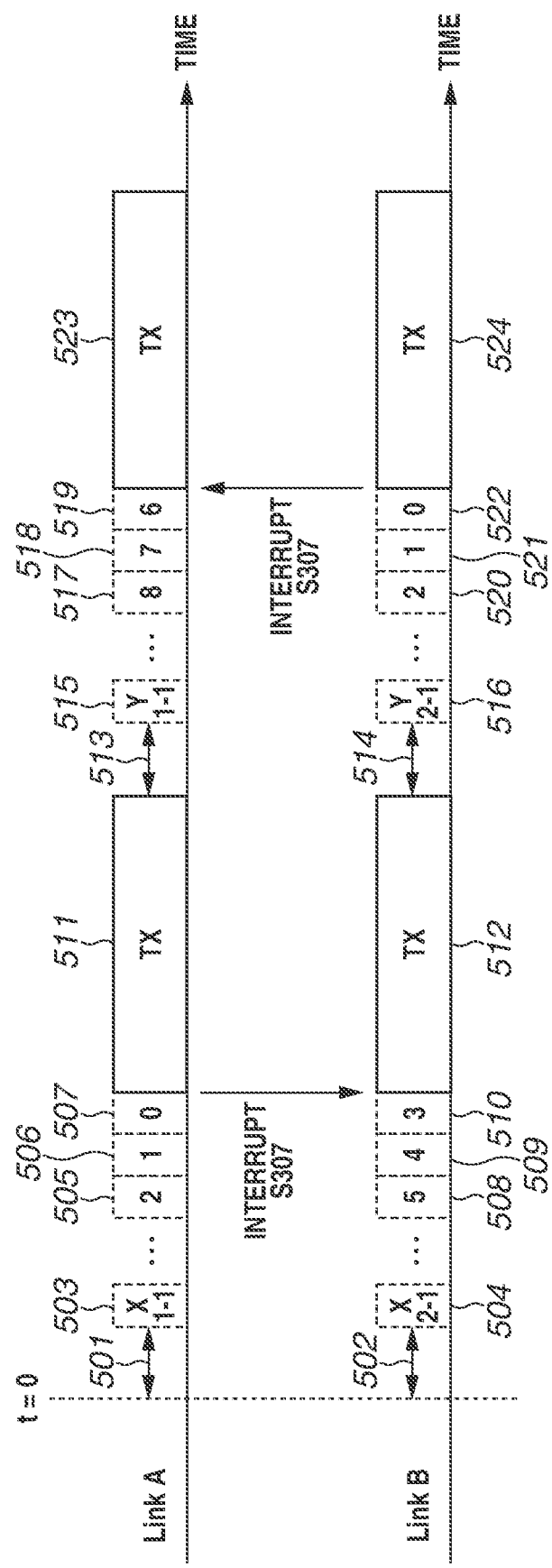

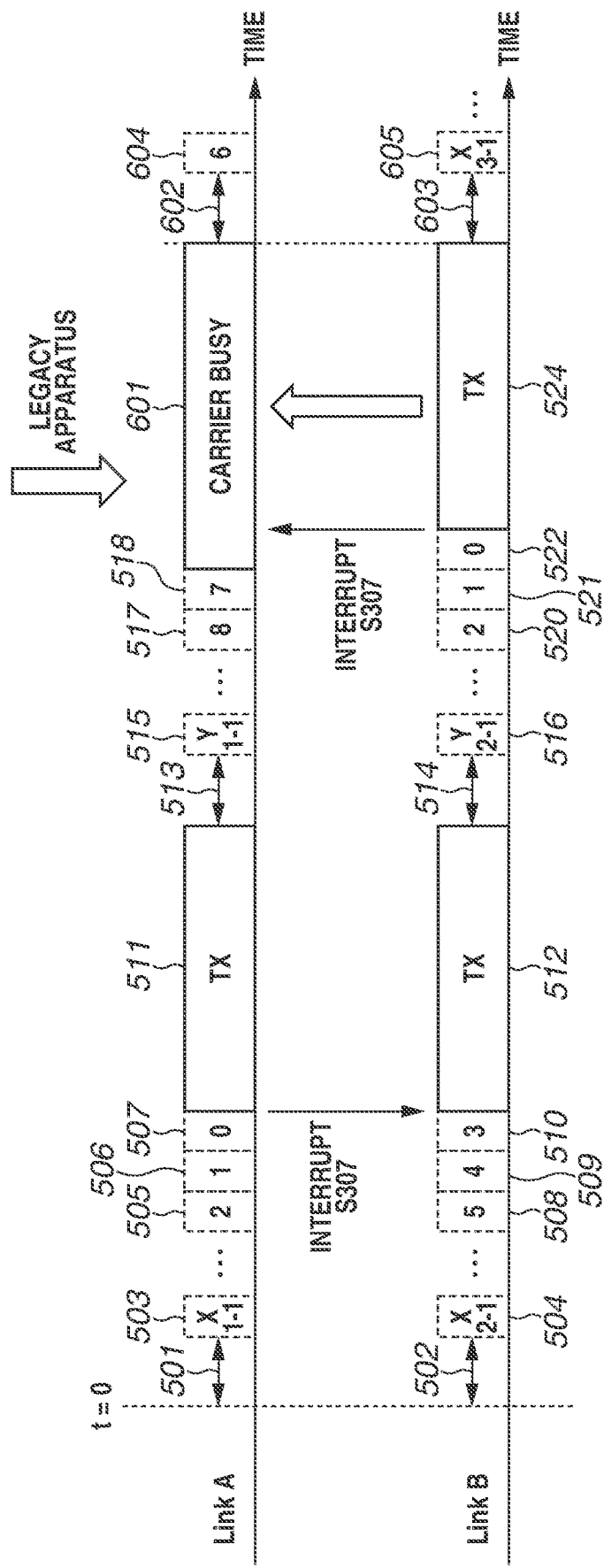

COMMUNICATION APPARATUS CAPABLE OF TRANSMITTING SIGNAL OVER MULTIPLE WIRELESS LINKS, COMMUNICATION METHOD, AND STORAGE MEDIUM

CROSS-REFERENCE TO RELATED APPLICATIONS

This application is a Continuation of International Patent Application No. PCT/JP2020/046909, filed Dec. 16, 2020, which claims the benefit of Japanese Patent Application No. 2019-233224, filed Dec. 24, 2019, both of which are hereby incorporated by reference herein in their entireties.

BACKGROUND OF THE INVENTION

Field of the Invention

The present invention relates to a communication control technique.

Background Art

As a communication method in conformity with the Institute of Electrical and Electronics Engineers (IEEE) 802.11 series standard, there is a method in which a terminal that has confirmed a wireless medium being idle for a predetermined period acquires a transmission opportunity, and transmits data (Japanese Patent Application Laid-Open No. 2006-157733). Here, the predetermined period has a random length measured using a random backoff counter (referred to as the random backoff time).

In addition, in the IEEE, the IEEE 802.11be standard has been studied as a new standard. For the IEEE 802.11be standard, a multilink operation of performing communication using a plurality of wireless links varying in frequency channel has been studied.

Suppose that a transmission opportunity is acquired in one wireless link in the above-described multilink operation. In this case, if a wireless medium of another wireless link is idle at the timing when the transmission opportunity is acquired, data transmission is simultaneously started in the plurality of wireless links, so that the medium access efficiency can be increased, and the communication rate can be improved.

However, in a case where such a medium access method is used, the probability that a terminal performing the multilink operation has a high probability of acquiring a transmission opportunity increases, in comparison with a terminal communicating using only one wireless link, so that there is an issue the fairness in access to wireless media cannot be maintained.

CITATION LIST

Patent Literature

PTL 1: Japanese Patent Application Laid-Open No. 2006-157733

SUMMARY OF THE INVENTION

In view of the above-described issue, the present invention is directed to making it possible to communicate using a plurality of wireless links, while taking the fairness in access to wireless media into consideration.

A communication apparatus includes one or more processors, and one or more memories including instructions that, when executed by the one or more processors, cause the communication apparatus to transmit a signal using a plurality of wireless links, based on confirmation that a wireless medium related to one wireless link among the plurality of wireless links varying in frequency channels is idle for a random backoff time determined by a first method, and transmit a signal using one wireless link, based on confirmation that a wireless medium related to the one wireless link is idle for a random backoff time determined by a second method different from the first method, wherein an expectation value of the random backoff time determined by the first method is larger than an expectation value of the random backoff time determined by the second method.

Further features of the present invention will become apparent from the following description of exemplary embodiments with reference to the attached drawings.

BRIEF DESCRIPTION OF THE DRAWINGS

FIG. 4 illustrates a flowchart implemented by the communication apparatus.
FIG. 5 is a timing chart illustrating an operation example when the communication apparatus performs transmission processing.
FIG. 6 is a timing chart illustrating an operation example when the communication apparatus performs transmission processing.

DESCRIPTION OF THE EMBODIMENTS

Figure 1:
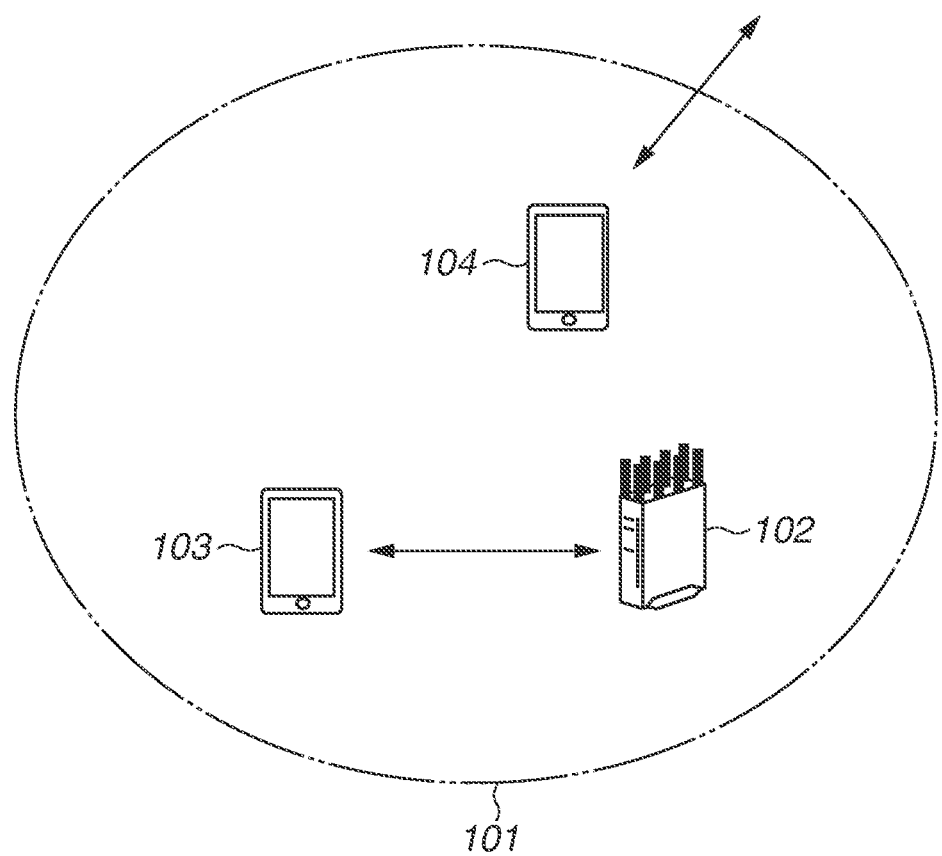
FIG. 1 illustrates a network configuration diagram.

FIG. 1 illustrates a configuration of a wireless network of a first exemplary embodiment. A wireless network 101 includes a base station 102 and a plurality of stations (hereinafter, STAs) 103 and 104. Here, the base station 102 is, for example, an access point (hereinafter, AP) in conformity with the Institute of Electrical and Electronics Engineers (IEEE) 802.11 series standard. However, the base station 102 is not limited thereto, and may be a group owner (hereinafter, GO) in conformity with the Wi-Fi Direct standard. In a case where the base station 102 is a GO, the STA 103 is also referred to as a client.

The base station 102 builds the wireless network 101, and transmits a beacon including identification information about the wireless network. Here, a dotted line illustrated as the wireless network 101 in FIG. 1 indicates a range where a signal transmitted by the base station 102 reaches, and the base station 102 can communicate with an STA within the range indicated by dotted line. The base station 102 may have a relay function.

In a case where the base station 102 has received a Probe Request signal (a search request) from an STA, the base station 102 transmits a Probe Response signal (a search response) including the identification information as a response. Examples of the identification information about the wireless network include a Service Set Identifier (hereinafter, SSID).

The base station 102 communicates with the STA 103, based on a wireless communication method of the IEEE 802.11be standard. The base station 102 executes a predetermined association process and the like and establishes a plurality of wireless links (wireless links A and B) with the STA 103.

In the present exemplary embodiment, the base station 102 and the STA 103 establish the wireless links A and B in the respective frequency channels A and B, and perform a multilink operation. The frequency channels A and B are channels belonging to any one of the 2.4 GHz band, the 5 GHz band, and the 6 GHz band. Here, the frequency channels (center frequencies) of the wireless links A and B are 5875 MHz (channel 175) and 6035 MHz (channel 207), respectively, and each operate in the 160 MHz bandwidth. The frequency channels may each be a channel different therefrom, and the bandwidth may be a bandwidth (such as 20 MHz, 40 MHz, 80 MHZ, and 320 MHZ) different from 160 MHz. Further, the number of wireless links established by the base station 102 and the STA 103 is not limited to two and may be three or more.

The STA 103 includes a backoff counter for the wireless link A and a backoff counter for the wireless link B so that Carrier Sense Multiple Access/Collision Avoidance (CSMA/CA) is implemented by each of the wireless links.

Further, in a case where a wireless medium related to each of the wireless links is idle, the backoff counter for the corresponding wireless link is decremented (counted down) by 1. Subsequently, when either one of the backoff counters becomes 0 and the wireless medium related to the other wireless link is idle, the STA 103 transmits data using the wireless links A and B simultaneously even if the backoff counter for the other wireless link is not 0. In this way, data is transmitted using the wireless links A and B simultaneously, and this transmission is called the multilink operation.

Transmitting data in such a manner can increase the efficiency of utilizing the wireless media, so that the system throughput can be improved. The case where a wireless medium is idle is a case where energy of a predetermined threshold or more cannot be detected in this wireless medium by carrier sense of the STA 103, and this wireless medium is determined to be unused.

The STA 104 is a communication apparatus in conformity with a standard such as the IEEE 802.11a/b/g/n/ac/ax, and establishes a wireless link with a base station (not illustrated) different from the base station 102 and perform communication in any one of the frequency bands included in the wireless links A and B. The STA 104 may establish a wireless link with the base station 102.

Figure 2:
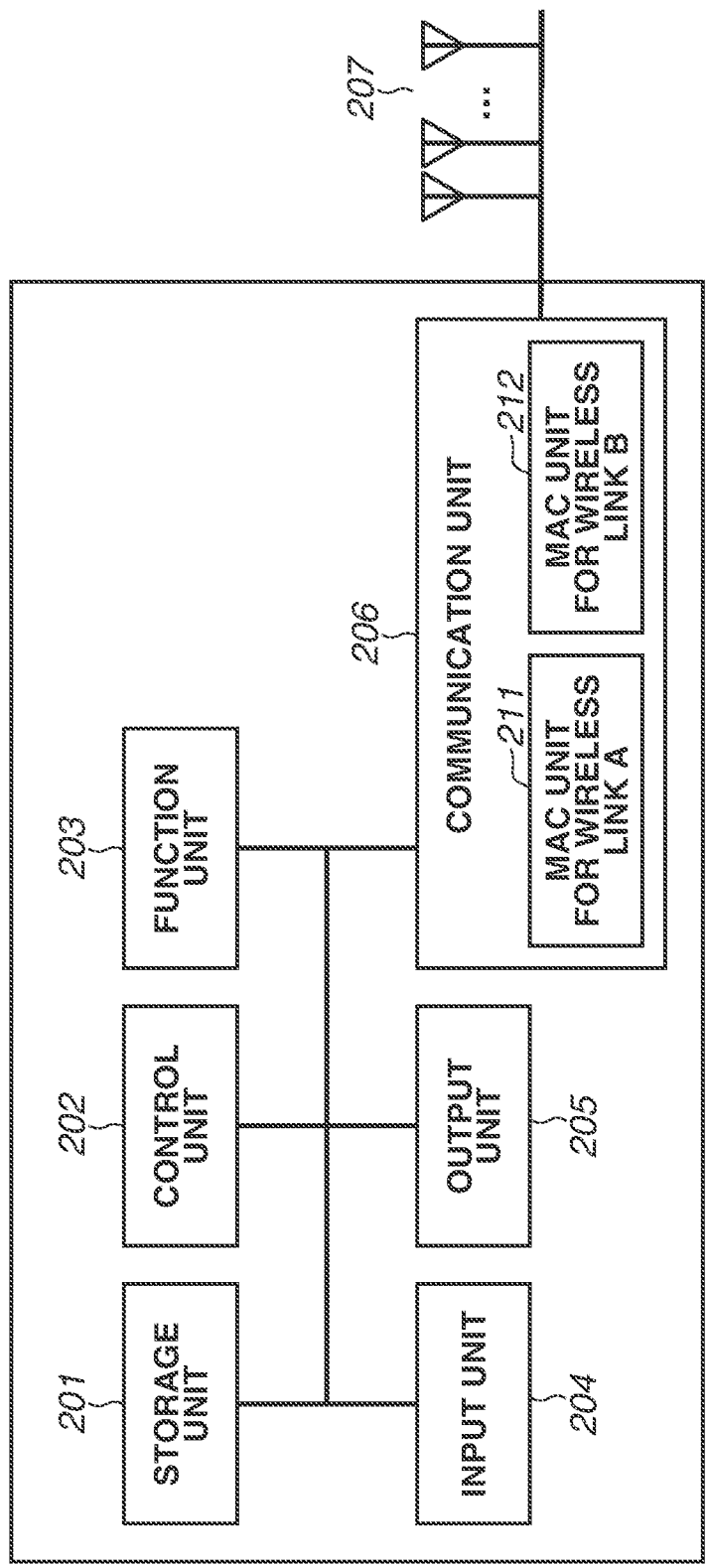
FIG. 2 illustrates a hardware block diagram.

FIG. 2 illustrates a hardware configuration of each of the base station 102 and the STA 103 (hereinafter collectively referred to as the communication apparatus). The communication apparatus has a storage unit 201, a control unit 202, a function unit 203, an input unit 204, an output unit 205, a communication unit 206, and one or more antennas 207.

The storage unit 201 is configured of one or more memories such as a read only memory (ROM) and a random access memory (RAM), and stores a program for performing various operations to be described below and various kinds of information such as communication parameters for wireless communication. In addition to the memory such as a ROM or RAM, a storage medium, such as a flexible disk, a hard disk, an optical disk, a magneto-optical disk, a compact disc-read only memory (CD-ROM), a compact disc recordable (CD-R), a magnetic tape, a nonvolatile memory card, and a digital versatile disc (DVD), may be used for the storage unit 201. The storage unit 201 may include a plurality of memories.

The control unit 202 is configured of one or more processors such as a central processing unit (CPU) and a micro processing unit (MPU), an application specific integrated circuit (ASIC), a digital signal processor (DSP), and a field programmable gate array (FPGA). The control unit 202 controls the communication apparatus by executing the program stored in the storage unit 201. The control unit 202 may control the communication apparatus by collaboration between the program stored in the storage unit 201 and an operating system (OS). Further, the control unit 202 may include a plurality of processors such as a multi-core processor to control the communication apparatus.

Further, the control unit 202 controls the function unit 203 to execute a predetermined function. The predetermined function is, for example, an imaging function if the communication apparatus is a camera. For another example, if the communication apparatus is a printer, the predetermined function is a printing function. For yet another example, if the communication apparatus is a projector, the predetermined function is a projection function. The predetermined function is not limited to these functions, and various functions are conceivable. The function unit 203 is hardware for executing the predetermined function.

The input unit 204 accepts various operations from a user. The output unit 205 performs various outputs for the user. Here, the outputs performed by the output unit 205 includes at least one of display on a screen, audio output from a speaker, and vibration output. A single module may implement both the input unit 204 and the output unit 205, as in a touch panel.

The communication unit 206 performs control of wireless communication in conformity with the IEEE 802.11be standard, control of Wi-Fi-compliant wireless communication, control of Internet Protocol (IP) communication, and the like. In addition, the communication unit 206 transmits and receives wireless signals for wireless communication by controlling the antennas 207. Further, the communication unit 206 includes a media access control (MAC) unit 211 for the wireless link A to perform MAC for the wireless link A and a MAC unit 212 for the wireless link B to perform MAC for the wireless link B.

Figure 3:
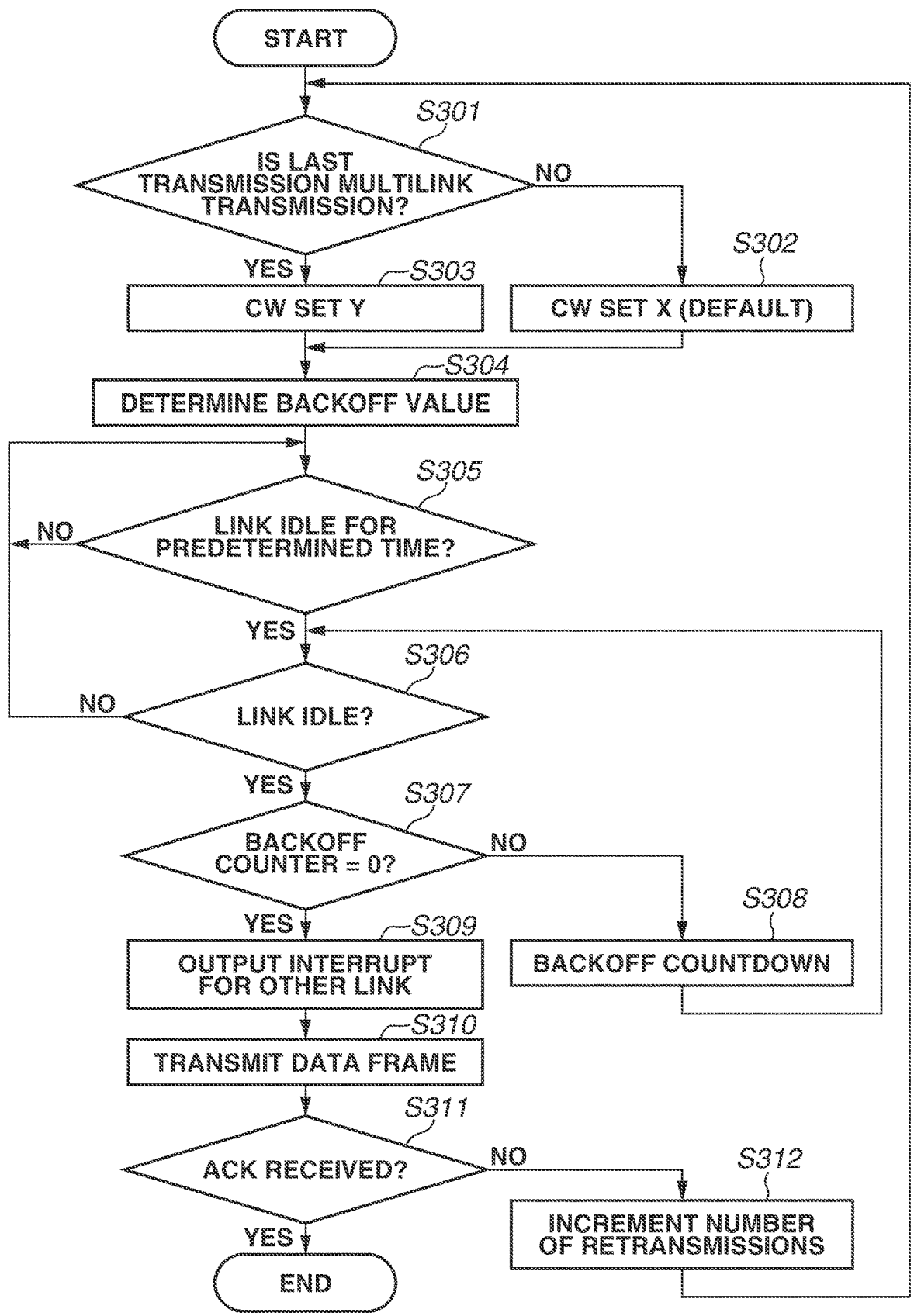
FIG. 3 illustrates a flowchart implemented by a communication apparatus.

Next, a data transmission operation of the STA 103 will be described with reference to FIG. 3 and FIG. 4. The processing in a flowchart illustrated in FIG. 3 starts when a data frame to be transmitted to the STA 103 is generated. The processing in the flowchart illustrated in FIG. 3 is implemented when the control unit 202 reads out the program stored in the storage unit 201 of the STA 103 and executes the program in collaboration with the MAC unit 211. Some or all of steps illustrated in the flowchart in FIG. 3 may be configured to be implemented by hardware such as an ASIC.

A case where the STA 103 executes the processing in FIG. 3 in collaboration with the MAC unit 211 will be described. However, the STA 103 executes the processing in FIG. 3 while collaborating with the MAC unit 211, and also executes the processing while collaborating with the MAC unit 212 in parallel therewith. These processes are executed independently. Regarding the case where the processing is executed in collaboration with the MAC unit 212, the MAC unit 211 in the following description may be read as the MAC unit 212, and the wireless link A may be read as the wireless link B.

First, in step S301, the STA 103 determines whether data is transmitted by the multilink operation with the MAC unit 212, i.e., whether data is transmitted in the wireless link A and the wireless link B simultaneously, when data is transmitted via the MAC unit 211 last time.

In a case where data transmission is not executed by the multilink operation last time, or in a case where data transmission is to be performed for the first time after the STA 103 and the base station 102 are connected (NO in step S301), then in step S302, a contention window (CW) set X is set as a CW. The CW is used to determine a time (a random backoff time) for confirming that the wireless medium related to the wireless link A is idle before the STA 103 transmits data. The CW set X set in step S302 includes CW min that is the minimum CW value and CW max that is the maximum CW value.

The CW min and CW max are both integers. Here, the CW is calculated as follows within a range not exceeding the CW max.

$$CW=(CW\ min+1)\times 2^{(number\ of\ retransmissions)}-1$$

Here, the symbol "^" represents a power. In a case where no retransmission has occurred, the calculation is performed with the number of retransmissions set to 0. In a case where the result of this calculation exceeds the CW max, CW=CW max is obtained. A value randomly selected from a range of 0 or more and the CW or less is the random backoff time. This random backoff time is managed as a random backoff value using the backoff counter.

In step S302, the STA 103 sets 15 slot time to the CW min, and 63 slot time to the CW max. These are the same values as those of a CW set, which is set by a legacy apparatus (such as the STA 104) in conformity with the standard such as the IEEE 802.11a/b/g/n/ac/ax. The slot time is the unit indicating a predetermined time (e.g., 9 μs), and defined by the base station 102 as a specification of the wireless network 101.

On the other hand, in a case where data transmission is executed by the multilink operation (YES in step S301), then in step S303, a CW set Y is set as the CW. Here, the CW set Y is set so that an expectation value of the random backoff time obtained from the CW set Y is greater than an expectation value of the random backoff time obtained from the CW set X.

As the CW set Y, 23 slot time is desirably set to the CW min, and 95 slot time to the CW max, for the following reason. Here, in explaining this reason, for simplification, a description is given of a case where CW=CW min is set, and the backoff time is randomly selected from a range of 0 or more and CW min or less, in each of the wireless links A and B. Further, the CW min of the CW set X is CW min_X, the CW min of the CW set Y is CW min_Y, the backoff time selected in the wireless link A is R_A, and the backoff time selected in the wireless link B is R_B. In this case, the expectation value of the backoff time of each of the wireless links is as follows.

$$E[R\_A]=E[R\_B]=CW\ min\_X/2\ (E[\ ]\ represents\ an\ expectation\ value\ operation)$$

On the other hand, in the multilink operation, the backoff time in the multilink operation is determined based on the shortest one of the respective backoff times selected in the wireless links A and B. Therefore, the expectation value of the backoff time in the multilink operation is as follows.

$$E[MIN[R\_A,R\_B]]=CW\ min\_Y\times(2\times CW\ min\_Y+1)/(6\times(CW\ min\_Y+1))(MIN[\ ]\ represents\ selection\ of\ a\ smaller\ value).$$

Here, if CW min_Y=CW min_X×3/2, the expectation value of the backoff time of each of the wireless links and the expectation value of the backoff time in the multilink operation substantially match each other. In other words, using such CW min makes it possible to obtain the fairness in access to the wireless media between the apparatus performing the multilink operation and the apparatus not performing the multilink operation.

Therefore, the STA 103 uses CW min_Y=CW min_X×3/2=15×3/2≈23 time slot as the CW set Y. In addition, for a similar reason, 95 slot time determined by multiplying the CW max in the CW set X by 3/2 is used for the CW max in the CW set Y.

In the present exemplary embodiment, the number of the wireless links in the multilink operation is described to be two. In this case, as described above, it is desirable to use values determined by multiplying each of the CW min and the CW max used by the apparatus not performing the multilink operation by the coefficient of 3/2. Further, in a case where the number of the wireless links is N, the fairness in access to the wireless media can be obtained by using values determined by multiplying each of the CW min and the CW max by a coefficient of (N+1)/2.

A value determined by multiplying only one (e.g., only CW min) of the CW min and the CW max by a predetermined coefficient may be used, and the other is set such that the value in the CW set X and the value in the CW set Y may be the same. The values of the CW set Y may be calculated by performing adding a predetermined numerical value in the CW set X, instead of performing multiplication by a predetermined coefficient. These calculations may be performed every time, or may be stored as predetermined parameters in the storage unit 201 beforehand.

When the CW set X or the CW set Y is thus set, then in step S304, the STA 103 determines a backoff time based on the set CW. Specifically, the CW is calculated by the above-described equation, and a value randomly selected from integers of 0 or more and the CW or less is determined as the backoff time. Then, the selected backoff time is set as the random backoff value in the backoff counter.

Next, in step S305, the STA 103 performs carrier sense for the wireless medium related to the wireless link A, using the MAC unit 211. The STA 103 continues the carrier sense until the STA 103 confirms that the idle state of the wireless medium has continued for a predetermined time (NO in step S305). Here, the predetermined time is, for example, a time determined by subtracting a time corresponding to 1 slot time from the Distributed Coordination Function InterFrame Space (DIFS) time of the legacy standard.

If the STA 103 confirms that the idle state of the wireless medium has continued for the predetermined time (YES in step S305), the STA 103 further performs carrier sense, using the MAC unit 211. Then in step S306, the STA 103 confirms that the idle state of the wireless medium has continued for the slot time (e.g., 9 μs). Here, in a case where the wireless medium is used (has entered a busy state) during this carrier sense (NO in step S306), the processing returns to step S305.

On the other hand, if the STA 103 confirms that the idle state of the wireless medium has continued for the slot time (YES in step S306), then in step S307, the STA 103 determines whether the backoff counter is 0. In a case where the backoff counter is not 0 (NO in step S307), then in step S308, the STA 103 decrements the backoff counter value by 1. In this way, upon the elapse of the time corresponding to the slot time, the counter value is decremented by 1. Afterward, the processing returns to step S306.

In a case where the backoff counter is 0 (YES in step S307), the STA 103 determines that a transmission opportunity for the wireless link A is acquired, and the processing proceeds to step S309.

In step S309, the STA 103 outputs an interrupt signal to the MAC unit 212. Alternatively, instead of doing so, the STA 103 outputs an interrupt signal to a process of controlling the MAC unit 212. In response to the output of this interrupt signal, the processing in a flowchart illustrated in FIG. 4 begins. Description with reference to FIG. 4 will be provided below. Subsequently, in step S310, the STA 103 transmits a data frame via the wireless link A, using the MAC unit 211.

Afterward, in step S311, the STA 103 waits for an acknowledgement (ACK) to be transmitted from the base station 102 via the wireless link A, for a predetermined time. Here, the ACK is a response signal indicating that the base station 102 has appropriately received the data frame transmitted by the STA 103 in step S310.

In a case where the ACK is received within the predetermined time (YES in step S311), the processing illustrated in FIG. 3 ends. At this time, the number of retransmissions is reset to 0. On the other hand, in a case where the ACK is not received within the predetermined time (NO in step S311), then in step S312, the STA 103 increments (adds 1 to) the number of retransmissions, and the processing returns to step S301. The "last transmission" in step S301 refers to the transmission of the data frame in immediately preceding step S310, i.e., the transmission of the data frame for which the receipt of the ACK has failed.

In this way, when the multilink operation is performed, the expectation value of the random backoff time is set to be long, as compared to a case where the multilink operation is not performed or the apparatus not performing the multilink operation. The fairness in access to the wireless media can be thereby obtained.

Next, a description will be given of the flowchart in FIG. 4, which starts in response to the output of an interrupt signal in step S309 in the flowchart in FIG. 3 that is executed in collaboration with the MAC unit 211. The processing in the flowchart illustrated in FIG. 4 is implemented by the control unit 202 reading out the program stored in the storage unit 201 of the STA 103 and executing the program in collaboration with the MAC unit 212.

In a case where an interrupt signal is output in step S309 in the flowchart in FIG. 3 that is executed in collaboration with the MAC unit 212, the processing in the flowchart in FIG. 4 is executed and then implemented in collaboration with the MAC unit 211.

In the following description, the case of execution in collaboration with the MAC unit 212 will be described. Regarding the processing executed in collaboration with the MAC unit 211, the MAC unit 212 in the following description may be read as the MAC unit 211, and the wireless link B may be read as the wireless link A.

In step S401, the MAC unit 212 detects the interrupt signal from the MAC unit 211, and the STA 103 performs carrier sense for the wireless medium related to the wireless link B, using the MAC unit 212. In step S402, the STA 103 determines whether this wireless medium is idle. This carrier sense is completed before the transmission of the data frame via the wireless link A starts in step S310. Instead of this, the result of execution of carrier sense immediately before interruption may be stored in the storage unit 201, and the STA 103 may determine whether the wireless medium is idle by referring to this execution result in step S402.

In a case where the wireless medium related to the wireless link B is not idle, i.e., the wireless medium is busy (NO in step S402), the STA 103 does not transmit the data frame via the wireless link B, using the MAC unit 212, and the processing in FIG. 4 ends. In this case, the data frame is transmitted only via the wireless link A, and therefore the data transmission by the multilink operation is not performed.

On the other hand, in a case where the wireless medium related to the wireless link B is idle (YES in step S402), then in step S403, the STA 103 transmits the data frame via the wireless link B, using the MAC unit 212. Then, in step S404, the backoff counter used by the MAC unit 212 is reset, and the processing illustrated in FIG. 4 ends. At this time, the processing in FIG. 3 executed in collaboration with the MAC unit 212 also ends.

In this way, if the wireless link B is in the idle state when the transmission opportunity for the wireless link A is acquired, the communication apparatus according to the present exemplary embodiment transmits the data frame, using the wireless links A and B simultaneously. Conversely, if the wireless link A is in the idle state when the transmission opportunity for the wireless link B is acquired, the communication apparatus transmits the data frame, using the wireless links A and B simultaneously. Subsequently, in the next data frame after this transmission by the multilink operation using the wireless links A and B simultaneously, the random backoff time is determined using the CW set Y.

FIG. 5 and FIG. 6 each illustrate a timing chart in a case where the above-described MAC processing is performed.

In FIG. 5, at the timing of t=0, the MAC unit 211 and the MAC unit 212 each start the MAC processing illustrated in FIG. 3.

Periods 501 and 502 each represent a DIFS period. The MAC unit 211 and the MAC unit 212 start random backoffs 503 to 510 after confirming that the idle state (link idle state) of the corresponding wireless medium has continued for the DIFS period.

Here, the respective backoff values of the random backoffs 503 and 504 are randomly selected based on the CW set X. Here, X1 and X2 (both 1 or greater) are selected as the random backoffs 503 and 504, respectively. If the link idle state continues thereafter, the backoff counter is counted down.

The backoff counter becomes 0 at the timing of the random backoff 507, and if the transmission opportunity for the wireless link A is determined to be acquired, the MAC unit 211 outputs an interrupt signal to the MAC unit 212, and transmits a data frame 511.

The MAC unit 212 executes the processing in FIG. 4, and transmits a data frame 512. As a result, the data frames 511 and 512 are simultaneously transmitted by multilink, using the wireless links A and B.

Upon completing the transmission of the data frames 511 and 512, the MAC unit 211 and the MAC unit 212 start random backoffs 515 to 522 after confirming link idle states in DIFS periods 513 and 514.

Because the last data frame transmission is the multilink transmission, the random backoffs 515 to 522 are determined using the CW_Y. The subsequent operation is similar to that performed in the case of the random backoffs 505 to 510.

As described above, in a case where there is no signal transmission from other communication apparatus such as the STA 104, the backoff time of the MAC processing according to the present exemplary embodiment is determined by smaller one of the backoff values selected by the MAC unit 211 and the MAC unit 212. In other words, the expectation value of the random backoff time is a small value as compared with that of a legacy apparatus or the like operating with a single link. In the CW set change processing (step S302) according to the present exemplary embodiment, the operation is performed so that the expectation value of the random backoff time becomes equal to that of the legacy apparatus or the like (the apparatus not performing the multilink operation) in the entire multilink operation, and therefore, the fairness to the legacy apparatus or the like is maintained.

FIG. 6 is a timing chart illustrating an operation example in a case where there is signal transmission from other communication apparatus such as the STA 104.

In FIG. 6, the wireless medium related to the wireless link A is in a busy state due to a transmission signal 601 from the STA 104, after a random backoff 518.

The MAC unit 212 outputs an interrupt signal to the MAC unit 211 after a random backoff 522. However, the MAC unit 211 does not transmit a data frame because the wireless medium related to the wireless link A is in the busy state.

In this case, due to the transmission signal in the wireless link B, in addition to the transmission signal from the STA 104, the wireless link A is in the busy state until the transmission of these signals is completed. This is because, in the present exemplary embodiment, the frequency channels of the wireless links A and B are 5875 MHz (channel 175) and 6035 MHz each (channel 207), respectively, and the wireless links A and B each operate in the 160 MHz bandwidth and thus interfere with each other.

In the example in FIG. 6, after the signal transmission from the STA 104 is completed, transmission of a data frame 524 is completed. In this case, the MAC unit 211 and the MAC unit 212 start random backoffs 604 and 605 after confirming link idle states in DIFS periods 602 and 603. The MAC unit 211 maintains the backoff counter value obtained before the carrier busy determination and performs a countdown operation, in the random backoff 604. On the other hand, the MAC unit 212 determines a backoff value using the CW set X because the last data frame transmission is not the multilink transmission.

In a case where there is no multilink transmission presence/absence determination (step S301) according to the present exemplary embodiment, a backoff value is always determined using the CW set Y if the multilink operation cannot be performed as in the operation example in FIG. 6. In other words, a backoff value is determined using the CW set Y in each of the wireless link A and the wireless link B, and the expectation value of the random backoff time is greater than that of the apparatus not performing the multilink operation, even in a case where the entire multilink operation is taken into consideration. In the present exemplary embodiment, operation is performed such that either the CW set X or the CW set Y is selected depending on the presence or absence of the multilink operation, so that the fairness can be maintained to a great extent.

As described above, in the present exemplary embodiment, there is provided the configuration in which either the CW set X or the CW set Y is selected and operation is performed in order to maintain the fairness to the apparatus not performing the multilink operation. However, it may be confirmed whether the apparatus not performing the multilink operation is present nearby, and only the CW set X may be used in a case where there is no such an apparatus. Due to this operation, in a case where the apparatus not performing the multilink operation is not present, the expectation value of the random backoff time is not increased, and thus the throughput can be improved. As a method of determining the apparatus not performing the multilink operation, a method of analyzing a signal from this apparatus is conceivable. For example, if this apparatus is an apparatus not supporting the IEEE 802.11be standard (i.e., an apparatus in conformity with the a/b/g/n/ac/ax standards) as a result of analyzing the signal, this apparatus can be determined as the apparatus not performing the multilink operation. Alternatively, this apparatus may be determined as the apparatus not performing the multilink operation by analyzing a signal from this apparatus and confirming the capability information about this apparatus.

Further, in the present exemplary embodiment, there is provided the configuration in which the expectation value of the random backoff time is changed by using the CW set Y, but a similar effect can be obtained by changing the slot time. There may be provided a configuration in which the expectation value of the random backoff time is changed by changing both the CW set and the slot time.

In a case where multilink operation is performed by a method different from that of the multilink operation described in the present exemplary embodiment, there may be provided a configuration in which the CW set Y is not used and the CW set X is always used. The method different from that of the multilink operation described in the present exemplary embodiment is, specifically, a method of performing independent media access control in each of the wireless link A and the wireless link B. In other words, this is a method in which, when the backoff counter for any one of a plurality of wireless links has become 0, data is transmitted only in the wireless link corresponding to the counter becoming 0, and data is not transmitted in the other wireless links. In such a method, the fairness can be maintained even if only the CW set X is used, so that it is not necessary to perform switching. Which method to be used for the operation may be set by a user, or may be set based on an instruction from the base station 102.

In this way, it can be determined whether to use the CW set Y depending on various conditions. Such control is not only performed in the STA but also may be performed in the base station. In addition, not all of the configurations described in the exemplary embodiment are necessarily essential to the invention, and these configurations may be freely combined.

The present invention can also be implemented by processing for supplying a program for implementing one or more functions in the above-described exemplary embodiment to a system or apparatus via a network or a storage medium and causing one or more processors in a computer of the system or apparatus to read and execute the program. The present invention can also be implemented by a circuit that implements the one or more functions (for example, an ASIC).

The present invention is not limited to the above-described exemplary embodiment, and various modifications and changes can be made without departing from the spirit and the scope of the present invention. Therefore, to apprise the public of the scope of the present invention, the following claims are attached.

It is possible to communicate using a plurality of wireless links, while taking the fairness in access to wireless media into consideration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   one or more processors; and one or more memories including instructions that, when executed by the one or more processors, cause the communication apparatus to operate as:
an establishing unit configured to establish a plurality of links including a first link and a second link different in frequency channel to another communication apparatus;
a first backoff unit configured to perform backoff processing on the first link on a basis of a first parameter set or a second parameter set;
a first communication control unit configured to control communication with the another communication apparatus on the first link;
a second backoff unit configured to perform the backoff processing on the second link on a basis of the first parameter set or the second parameter set; and
a second communication control unit configured to control communication with the another communication apparatus on the second link, wherein
the first communication control unit and the second communication control unit are capable of performing control such that the first backoff unit performs the backoff processing on a basis of a random backoff time that is based on the first parameter set, and such that frame transmission using the first link and the second link is performed on a basis of a confirmation that a wireless medium related to the first link is idle,
when the frame transmission using the first link and the second link is performed, the first backoff unit and the second backoff unit perform the backoff processing on a basis of a random backoff time that is based on the second parameter set, and
an expectation value of the random backoff time that is based on the first parameter set is less than an expectation value of the random backoff time that is based on the second parameter set.

2. The communication apparatus according to claim 1, wherein
each of the first parameter set and the second parameter set at least includes CWmin, which is a parameter indicating a minimum value of a contention window (CW), and CWmax, which is a parameter indicating a maximum value of CW.

3. The communication apparatus according to claim 2, wherein
a value of the CWmin of the first parameter set is less than a value of the CWmin of the second parameter set.

4. The communication apparatus according to claim 3, wherein
a value of the CWmax of the first parameter set is less than a value of the CWmax of the second parameter set.

5. The communication apparatus according to claim 1, wherein
the first communication control unit and the second communication control unit perform the control to transmit a frame that is in conformity with an Institute of Electrical and Electronics Engineers (IEEE) 802.11 series standard.

6. The communication apparatus according to claim 1, wherein
when the communication apparatus performs the frame transmission using the first link and the second link,
in a case where a predetermined condition is satisfied, the first backoff unit and the second backoff unit perform the backoff processing on the basis of the random backoff time that is based on the second parameter set, and
in a case where the predetermined condition is not satisfied, the first backoff unit and the second backoff unit perform the backoff processing on the basis of the random backoff time that is based on the first parameter set.

7. The communication apparatus according to claim 6, wherein the communication apparatus is further caused to operate as:
a detection unit configured to detect another communication apparatus that does not support an IEEE 802.11be standard, wherein
the case where the predetermined condition is satisfied is a case where the another communication apparatus that does not support the IEEE 802.11be standard is detected by the detection unit.

8. The communication apparatus according to claim 6, wherein the communication apparatus is further caused to operate as:
a detection unit configured to detect another communication apparatus that performs communication using a single wireless link, without using a plurality of wireless links, wherein
the case where the predetermined condition is satisfied is a case where the another communication apparatus that performs communication using the single wireless link, without using the plurality of wireless links, is detected by the detection unit.

9. A method of controlling a communication apparatus, the method comprising:
establishing a plurality of links including a first link and a second link different in frequency channel to another communication apparatus;
performing backoff processing on the first link on a basis of a first parameter set or a second parameter set;
controlling communication with the another communication apparatus on the first link;
performing the backoff processing on the second link on a basis of the first parameter set or the second parameter set; and
controlling communication with the another communication apparatus on the second link; and
performing control such that the backoff processing on a basis of a random backoff time that is based on the first parameter set, and such that frame transmission using the first link and the second link is performed on a basis of a confirmation that a wireless medium related to the first link is idle, wherein
when the frame transmission using the first link and the second link is performed, the backoff processing is performed on a basis of a random backoff time that is based on the second parameter set, and
an expectation value of the random backoff time that is based on the first parameter set is less than an expectation value of the random backoff time that is based on the second parameter set.

10. A non-transitory computer readable storage medium storing a computer-executable program for causing a computer to execute a control method for controlling a communication apparatus, the control method comprising:
establishing a plurality of links including a first link and a second link different in frequency channel to another communication apparatus;
performing backoff processing on the first link on a basis of a first parameter set or a second parameter set;
controlling communication with the another communication apparatus on the first link;

performing the backoff processing on the second link on a basis of the first parameter set or the second parameter set; and controlling communication with the another communication apparatus on the second link; and performing control such that the backoff processing on a basis of a random backoff time that is based on the first parameter set, and such that frame transmission using the first link and the second link is performed on a basis of a confirmation that a wireless medium related to the first link is idle, wherein when the frame transmission using the first link and the second link is performed, the backoff processing is performed on a basis of a random backoff time that is based on the second parameter set, and an expectation value of the random backoff time that is based on the first parameter set is less than an expectation value of the random backoff time that is based on the second parameter set.

* * * * *